US012661660B2

(12) United States Patent
Möschl

(10) Patent No.: US 12,661,660 B2
(45) Date of Patent: Jun. 23, 2026

(54) AGITATING MILL

(71) Applicant: NETZSCH-Feinmahltechnik GmbH, Selb (DE)

(72) Inventor: Holger Möschl, Selb (DE)

(73) Assignee: NETZSCH-Feinmahtltechnik GmbH, Selb (DE)

( * ) Notice: Subject to any disclaimer, the term of this patent is extended or adjusted under 35 U.S.C. 154(b) by 300 days.

(21) Appl. No.: 18/252,761

(22) PCT Filed: Oct. 28, 2021

(86) PCT No.: PCT/DE2021/000175
§ 371 (c)(1),
(2) Date: May 12, 2023

(87) PCT Pub. No.: WO2022/100772
PCT Pub. Date: May 19, 2022

(65) Prior Publication Data

US 2024/0001373 A1 Jan. 4, 2024

(30) Foreign Application Priority Data

Nov. 13, 2020 (DE) ..................... 10 2020 130 055.7

(51) Int. Cl.
*B02C 17/16* (2006.01)

(52) U.S. Cl.
CPC .................................. *B02C 17/161* (2013.01)

(58) Field of Classification Search
CPC .................................................... B02C 17/161
See application file for complete search history.

(56) References Cited

U.S. PATENT DOCUMENTS

2011/0036935 A1* 2/2011 Stehr ..................... B02C 17/163 241/173
2011/0168814 A1* 7/2011 Brook-Levinson .......................... B02C 17/161 241/21

(Continued)

FOREIGN PATENT DOCUMENTS

DE 4216939 A1 * 11/1993 ........... B02C 17/161
DE 10064828 B4 * 7/2007 ........... B02C 17/161
DE 102012013279 A1 1/2014

OTHER PUBLICATIONS

English translate (DE4216939A1), retrieve date Jun. 30, 2025.*

(Continued)

*Primary Examiner* — Mohammed S. Alawadi
(74) *Attorney, Agent, or Firm* — Whitmyer IP Group LLC

(57) ABSTRACT

An agitator mill, in particular an agitator bead mill having a mill housing, in which an agitator shaft, preferably bearing agitator elements, circulates in such a way that a grinding chamber is configured between the agitator shaft and the mill housing, and into the chamber the grist is fed, transported by a fluid carrier substance, as a rule in the form of a suspension, wherein the grinding chamber is partially filled with grinding media, which are set in motion by the circulating agitator shaft and thereby the grist, carried through the grinding chamber by a fluid carrier substance, is crushed, wherein the grist, transported by the fluid carrier substance, is discharged together with the carrier substance through a sieve, which retains grinding media that arrive as far as the area of the sieve, wherein the sieve consists of several sieve elements arranged one after the other along the longitudinal axis of the agitator mill, the sieve elements being penetrated in parallel manner, with their surfaces flowing from the grinding chamber, and extend diagonally (Continued)

or radially to the axis, around which the agitator shaft circulates.

19 Claims, 12 Drawing Sheets

(56) References Cited

U.S. PATENT DOCUMENTS

2013/0233953 A1* 9/2013 Enderle .................. B02C 17/16
241/38
2018/0104698 A1* 4/2018 Simons ............... B02C 17/1855

OTHER PUBLICATIONS

English translate (DE10064828B4), retrieved date Oct. 5, 2025.*
International Search Report and Written Opinion of the International Searching Authority; Application No. PCT/DE2021/000175; Completed: Mar. 18, 2022; Mailing date: Mar. 28, 2022; 10 Pages.

* cited by examiner

AGITATING MILL

TECHNICAL FIELD

The invention relates to an agitator mill having a mill housing into which the grist is fed and a sieve through which the grist is removed from the mill housing.

BACKGROUND

The fundamental principle of an agitator mill will be described at first with reference to FIG. 1.

FIG. 1 schematically depicts an agitator mill 1 having a horizontal agitator shaft 3. The grinding media situated in the mill housing 2, which as a rule are constructed of steel or ceramic spheres, are not shown in the drawing.

During operation of the agitator mill 1, the grist to be ground is pumped by way of the inlet 5 of the agitator mill 1 into or through the grinding chamber 7 surrounded by the mill housing 1. The grist to be ground, in the event of wet grinding, is a suspension or dispersion consisting of a liquid, primarily in the form of water, and solid materials. In other cases, such an agitator mill can be used also for dry grinding. It can then be configured as, for instance, an agitator mill with vertical shaft, through which the grist is carried forward by a gaseous fluid, primarily in downdraft.

The present invention, in its broadest aspect, relates to both types of agitator mill. Most particularly preferred is its use in agitator mills with horizontal agitator shaft.

The agitator elements 8, also frequently designated as grinding disks, which are connected in torque-proof manner with the agitator shaft 3, are set in rotation by a rotating motion of the agitator shaft 3. It is likewise possible, also within the context of the invention to be described here, to configure the agitator elements 8 in the form of individual pins. To produce the rotating motion, the agitator shaft 3 can be powered, for instance by an electrical motor 9 using a belt drive 10. The power unit of the agitator mill 1 here is usually situated in a housing 11 adjoining the mill housing 2.

By rotating the agitator elements 8, the grinding media contained in the grinding chamber 7, which are situated close to the agitator elements 8, are also moved in the peripheral direction of the mill housing 2. In the middle region between two given agitator elements 8, the moved grinding media flow back in the direction of the agitator shaft 3 as soon as they have reached the peak area. In this manner, a circulatory motion of the grinding media occurs between a given pair of agitator elements 8.

As a result of the motion of the grinding media, collisions are caused between the solid materials of the grist suspension, pumped through the grinding chamber 7, and the grinding media. The said collisions result in the chipping off of fine particles from the solid materials in the grist suspension, and thus the solid materials arriving at the outlet 6 of the agitator mill 1, in the final analysis, are clearly smaller than those fed in at the inlet point 5.

To ensure that grinding media are not conveyed out of the grinding chamber, an additional separating system 4 is installed, for instance in the form of a sieve or filter (hereinafter referred to only as a "sieve"), before the outlet 6 through which the grist is removed.

Drum sieves are typically employed to prevent the grinding media from leaving the mill housing. These drum sieves perform their sifting effect by means of a perforated peripheral enclosure surface and offer a relatively large filtering area in a proportionally small space, thereby causing only relatively little pressure waste.

Owing to the rotating motion produced by the agitator shaft, the grinding media found in the region of the drum sieve are also set in motion in the peripheral direction of the rotating shaft. Concurrently, the grinding media are pulled in the direction of the enclosure surface of the sieve by the suction effect on the sieve.

As a result, the grinding media on the enclosing surface of the drum sieve slide along, from the applied power, in the direction perpendicular to the enclosing surface of the sieve. This in turn causes undesired severe abrasive wear on the enclosing surface of the drum sieve.

Because sufficient durability of the sieve can be ensured only by the use of abrasion-resistant materials, the options in selecting the sieve material are severely limited. Ceramic sieves or sieves with ceramic coating are typically employed. It has not been unusual heretofore to see the sieves configured as ceramic bodies, each of which comprise an enclosure surface forming a sieve and are stacked and then bolted together, eventually forming a sieve sleeve. While a good degree of abrasion-proof durability is ensured, this also increases the manufacturing cost for the sieves. In addition, this imposes a limit in the very cases where the goal is to further increase the sieve surface.

SUMMARY

Consequently, it is the object of the invention to provide an agitator mill having a separating system which is subject to less abrasion by the grinding media.

According to the invention, the aforementioned problem is solved as a result of the features of the principal claim.

The solution to the problem, accordingly, is achieved by means of an agitator mill having a mill housing in which an agitator shaft, preferably bearing grinding components, circulates in such a way that a grinding chamber is formed between the agitator shaft and the mill housing. Grist transported by a fluid carrier substance is fed into the grinding chamber. As a rule, the fluid carrier substance is in the form of a suspension. The grinding chamber is filled partly or predominantly with grinding media. The degree of filling is preferably 75% to 90%. The grinding media are set in rotating motion by the circulating agitator shaft. As a result, the grist carried through the grinding chamber by a fluid carrier substance is crushed. The grist conveyed by the fluid carrier substance, along with the carrier substance, is drawn through a sieve. The sieve in this case retains the grinding media.

The inventive agitator mill is distinguished in that the sieve consists of several sieve elements arranged one after the other along the longitudinal axis of the agitator mill and penetrated in parallel manner. Preferably two, or better at least eight, sieve elements of this kind are arranged one after the other. The surfaces of the sieve elements streaming in from the grinding chamber, that is, broadly speaking, the perforated surfaces, which perform the actual sieve effect, extend essentially diagonally or radially to the axis around which the agitator shaft circulates.

The fluid carrier substance along with the grist it bears, as well as the grinding media that are in contact with the grist and the carrier substance, are also conveyed by the agitator shaft and accordingly move in the peripheral direction of the agitator shaft. Because the grinding media in the area of the sieve elements are clearly larger and heavier than the individual components of the grist, the grinding media are kept apart, at least substantially, by the flow forces from the region of the sieve elements.

As a result, in the region of the sieve elements—even when the sieves are not in operation—there is no abrasive slipping, or scarcely any, of the grinding media along the sieve surfaces.

Even during start-up of the agitator mill, there is scarcely any abrasive wear on the part of sieve elements by contact with the grinding media. The grinding media do not immediately extend outward, but instead move first on a spiral track between the sieve elements. The motion direction of the grinding media in this case also runs parallel to the surface of the sieve elements. Because the grinding media, however, slide along the sieve surfaces without being particularly pressed against them, abrasion is avoided, at least for the most part.

According to the invention, the sieve consists of several sieve elements. Each of the sieve elements forms at least one sieve surface through which the grist, together with the carrier substance, can flow out of the grinding chamber. As a whole, then, the sieve surfaces of all sieve elements provide a total sifting surface that—as a rule—is several times greater than in the existing solutions.

The term "sieve element" designates in each case a portion of the sieve that forms a sieve surface.

The term "sieve surface" designates a flat portion that is perforated, or provided with holes, slits, or pores, and serves to hold back the grinding media while the carrier substance together with the grist can stream through the holes, slits, etc.

The term "surface" designates in this case one or both parallel surfaces of a sieve element, which in proportion to the other surface(s) of the sieve element is more than four-fold greater. If the term used here, "surface," is applied to a normal sheet of paper, then it designates both the surfaces of the sheet that are describable in the intended manner. According to the invention, one of these surfaces is situated in the grinding chamber and configures the incoming streaming surface of the sieve element, while the other is outside the grinding chamber and configures the outward-streamable surface.

The expression "flows in parallel manner" corresponds here to a hydraulic or streaming technology interconnection that, in principle, is equivalent to an electrical parallel connection—preferably even in such a way that the whole is equivalent to an electrical parallel connection of several resistances of equal, or at least substantially equal, size. Altogether here, the sieve elements correspond analogously to the electrical resistances.

The grinding media are preferably spheres or essentially spherical, but it is also possible to employ grinding media that are also defined as geometrically different or not precisely designed geometrically, or as irregularly shaped or jagged.

A series of possibilities exist for configuring the invention in such a way that its effectiveness or usability is improved even further.

It should be mentioned in advance, in a very general sense, that it is very advantageous to configure the sieve elements and the related sieve carriers in such a way that the sieve elements are replaceable—ideally by hand, without immediately requiring material-separating activity. This accelerates any necessary overhauling, because the sieve carrier does not also have to be replaced after each use.

It is thus especially preferable that each sieve element forms the front surface of an essentially peripherally closed sieve carrier. Thus, each sieve element is preferably of steel, ideally stainless steel, construction.

Each sieve carrier here is essentially shaped as a hollow cylinder, which comprises an opening on at least one front surface. The at least one opening is covered by a sieve element when in the assembled state. In the radial direction, each sieve carrier is essentially closed. Ideally each sieve carrier is disposed coaxially to the agitator shaft.

As was described above, inventive sieve elements only insignificantly incur abrasive wear as a result of contact with grinding media. Therefore, the sieve elements need not be constructed of particularly abrasion-resistant materials or coated with such materials. Steel can be used instead. This facilitates the manufacture of the sieve elements. Thus, steel sieves can be considerably more simply and more precisely produced, for instance by lasers, than sieve structures made of non-abrasive ceramic.

The designation "essentially peripherally closed" indicates that carrier substance and/or grist already streamed by a sieve element into the interior of the sieve carrier cannot flow off in the radial direction, away from the longitudinal axis of the sieve carrier, out of the sieve carrier. This does not rule out the possibility that single openings are provided on the peripheral enclosure surface of the sieve carriers.

In another preferred embodiment, the agitator mill comprises sieve carriers, both of whose front surfaces are configured by sieve elements.

The grist can therefore flow from two sides into each sieve carrier and, from there, out of the mill housing. Consequently, a maximal total sieve surface is obtained. The mill flow rate can thereby be maximized, with relatively less suction effect on the individual sieve elements. Reduced suction effect on the sieve elements is advantageous because the flow forces that move the grinding media away from the sieve elements, as a result, are not overcome by the suction effect. This in turn reduces the risk of increased abrasion on sieve elements.

In another preferred embodiment, the agitator mill comprises sieve carriers whose outer ring possesses an essentially closed peripheral enclosure surface.

It is therefore important to configure the sieve carriers in multiple parts in order to facilitate assembly. In this case, each sieve carrier comprises an outer ring with essentially closed peripheral enclosure surface, which when assembled surrounds the remaining sieve carrier and the at least one sieve element.

Here the enclosure surface of the outer rings is constructed advantageously of highly abrasion-resistant material or is coated with such material. In particular with stationary sieve carriers, this contributes to increased durability. It should be mentioned in this connection that it is a particularly preferred option to have the respective sieve carriers made completely of ceramic material.

The designation "essentially closed enclosure surface" corresponds to the previously defined designation "peripherally closed."

Ideally, the outer ring is of ceramic material. Alternatively, its peripheral enclosure surface bears an abrasion-reducing coating, in particular a coating of ceramic material.

The grinding media found in the mill chamber rotates as a result of the rotary motion about the sieve carriers. As explained above, the grinding media are kept distant from the sieve elements as a result of the resulting centrifugal forces. On the enclosure surface of the outer ring, however, the same abrasive effects can occur as with the drum filters described heretofore. Thus, owing to the use of abrasion-resistant materials, the durability of the sieve carries can be increased.

In another preferred embodiment, the outer ring of the sieve bearer is connected by spokes with a hub sleeve of the sieve carrier.

As a result, a large, free stream cross-section is available inside a sieve carrier. This in turn contributes to improving the flow rate of the agitator mill.

The hub sleeve ideally runs coaxially to the longitudinal axis of the sieve carrier and serves to mount the sieve carrier on a shaft.

The term "spokes" is to be understood in the broader sense and merely reveals that the longitudinal-axis region of the sieve carrier is connected with the region close to the housing surfaces by means of bridges and vacant space exists between the bridges.

Ideally, the hub of the sieve carrier includes at least one drain opening for the fluid carrier and the grist it bears. Preferably, the hub comprises several discharge openings.

The fluid carrier streamed through a sieve element into the interior of the sieve carrier, together with the grist, can stream into a corresponding outlet channel through the drain opening of the hub.

In an additional preferred embodiment, the sieve carriers are borne by a drain tube. The fluid carrier substance and the grist transported by it are moved from the sieve carrier into the drain tube.

For this purpose, the sieve carriers with their hub sleeve are pushed up onto the drain tube and are connected with it in torque-proof manner. The discharge openings of the hub of the sieve carrier and the corresponding discharge openings in the drain tube match up completely or almost completely. The fluid carrier reaching the sieve carrier, together with the grist carried by it, can then flow into the drain tube through the discharge openings of the hub sleeve and the corresponding openings of the drain tube. From there, the fluid carriers and the grist can be conveyed out of the mill housing.

Especially preferred is an embodiment in which the at least 5, better at least 10 and ideally at least 15 sieve carriers, independent of one another and constructed as separate components, primarily in the form of non-variable parts, are disposed in a row along the longitudinal axis.

As a result, an enormously enlarged total sieve surface is provided. At the same time, the stream is spatially distributed so that the stream produced in the radially inward direction, or the suction producing it, is not so strong in any one location that grinding media in any appreciable amount are dragged along in the radially inward direction. As a result, the grinding media are more effectively distanced from the sieve.

In another preferred embodiment, the sieve or the sieve carrier constituting the sieve is disposed so that it is separated from the grinding chamber and, for the most part, positioned further inward in a sieve chamber that is primarily configured in the agitator shaft, which ideally means there is at the same time an enlargement of the available grinding chamber. At the same time, another result of this radial "further inside positioning" is that any grinding media that somehow reach the sieve carriers, have only a minor abrasive effect precisely because their peripheral speed is all the lower, the closer they are situated to the rotational axis of the agitator shaft.

The sieve chamber is thus configured in such a way that the direction of motion of the grinding media is diverted before they reach the sieve chamber. The grinding media, accordingly, can reach the sieve chamber only, or primarily, as a result of the suction effect occurring on the sieve elements. Ideally, the sieve chamber is configured owing to the fact that a portion of the agitator shaft is configured as a hollow shaft whose diameter, in comparison with the remainder of the agitator shaft, is preferably greater by a factor of 1.5.

In an additional preferred embodiment, the grinding chamber is connected with the sieve chamber by rotary openings in the portion that constitutes the sieve chamber. The rotary openings are preferably produced in the form of slits whose primary extending axes run parallel to the longitudinal axis.

The portion bounding the sieve chamber is ideally powered by the agitator shaft so that the sieve chamber rotates. The slits thus also serve as rotating power drivers of the carrier substance, the grist, and the grinding media. Thus, the grinding media also, which are already situated in the sieve chamber, are, as much as possible, kept at a distance from the sieve elements by centrifugal forces.

In an especially preferred embodiment, the sieve carriers rotate during operation. Ideally, the rotating motion of the sieve carriers is produced by being carried by a drain tube that, in turn, is rotating. The sieve carrier either can be set in motion separately by a second power drive/motor or the sieve carrier is mounted on the same shaft as the agitator elements.

Thus, the sieve carriers are connected non-rotatably with the drain tube and the drain tube is impacted by a rotating motion. The result is that less abrasion occurs on the outer periphery of the sieve carriers because in the peripheral direction lower differential speeds exist in the grinding media carried along in the peripheral direction.

Feeding of the fluid carrier substance together with the grist serves to rinse the region freely between any two sieve carriers. Any grist possibly accruing on the sieve elements is thus released from the sieve elements. This is particularly significant if the sieve carriers are not also rotating, but instead remain stationary.

In an additional preferred embodiment, the drain tube bears at least one compensation channel. By way of the at least one compensation channel, the fluid carrier substance with the grist is advanced and released into the at least one intermediate space. In this case, each compensation channel is preferably configured by a tube that is arranged between the drain tube and the hub sleeve and, as a rule, is held by them. The drain tube preferably bears several feeder channels of this kind.

The at least one compensation channel with its openings ensures that the low pressure arising because of the rotation can be compensated in the intermediate space between the neighboring sieve surfaces. The aforementioned intermediate space is connected with the wave-like region of the grinding chamber, and thus material burdened with few grinding media can stream behind by means of this connection.

In another preferred embodiment, the individual sieve openings of a sieve element, which is preferably rotating with the agitator shaft on its side to which the flow arrives from the grinding chamber, have a greater diameter than the grinding media.

The cone-shaped configuration has the advantage that when the machine is switched off, no grinding media can reach the discharge through the sieve, because the gravity force then active allows the grinding media that have penetrated into a sieve opening to fall back into the grinding chamber by way of the slope.

In another preferred embodiment, the said sieve openings are each narrowing, in funnel shape, in the inward direction.

Proceeding from the sides of the sieve openings facing away from the respective sieve carriers, the diameter of the sieve openings therefore is constantly decreasing.

This has the advantage, on the one hand, that the surface contact of the grinding media with the sieve openings, already described, is even better ensured. On the other hand, the arrangement ensures that grinding media that have penetrated either whole or in parts into the sieve openings will not remain there. Instead, the grinding media slide or roll down by way of the slope of the sieve opening and fall back out of the latter. In particular with rotating sieve elements, the grinding media that have penetrated into the sieve openings are transported out of the sieve openings, in addition, by the arising centrifugal forces in combination with the slopes of the sieve openings.

In an additional preferred embodiment, the funnel-shaped narrowing area of a sieve opening on its narrowest side leads into a channel. This transition preferably is made in a sudden motion. The (smallest) diameter of the channel is smaller than the smallest diameter of the grinding media.

The diameter of the sieve openings, which is smaller than the median diameter of the grinding media, in this case is so far inside the sieve opening that the grinding media must abandon their regular movement track in order to reach this diameter. Therefore, the grinding media reach this diameter with only a reduced motion energy and then no longer cause the sieve openings any appreciable damage.

In an additional preferred embodiment, on the downstream side of the sieve openings, a separator plate is mounted on the inner surface of the sieve element at a distance from it. The separator plate is preferably made of sheet metal. It is thus attached to the sieve element in such a way that, between the inner surface of the sieve element and the separator plate, a gap is configured. The fluid carrier substance, with the grist transported by it, must pass through this gap, connecting to the narrowest point on the sieve opening. The gap preferably has a height that, as a rule, is less than the diameter of the grinding media, in many applications at least 30%.

The actual separation of the fluid carrier substance and the grist it transports from the grinding media then takes place in a region in which a grinding medium cannot cause any further abrasive friction action once it has arrived there.

The "downstream side" of the sieve opening is the side of the sieve opening facing the interior of the sieve carrier when the sieve element is in assembled state.

The "inside" surface of the sieve element is the surface facing the inside of the sieve carrier when the sieve element is in assembled state.

In an additional preferred embodiment, the separator plate, in turn, has openings whose opening longitudinal axis runs parallel to the longitudinal axis of the agitator mill. In this case the openings of the separator plate and the corresponding openings of the sieve element are arranged with respect to one another in a displacement, as seen in the radial and/or peripheral direction. The displacement is configured in such a way that the fluid carrier substance with the grist it transports must pass through a gap between the inner surface of the sieve element and the separator plate in order to flow outward from a sieve opening through an opening of a separator plate.

In this embodiment, as well, the actual separation of the fluid carrier substance and the grist carried by it from the grinding media then occurs in a region in which a grinding medium can cause no further abrasive frictional effect, should it have arrived there.

It can be stated in principle that the sieve openings in the dynamic configuration, whose sieve carriers rotate along with them, can be greater than the grinding media diameters. In the static configuration, whose sieve carriers are not rotated with them but are completely stationary, the sieve openings, on the contrary, must be smaller than the grinding media diameter.

DETAILED DESCRIPTION

The functioning of the invention is explained by way of example with reference to FIGS. 2 through 8.

Figure 1:
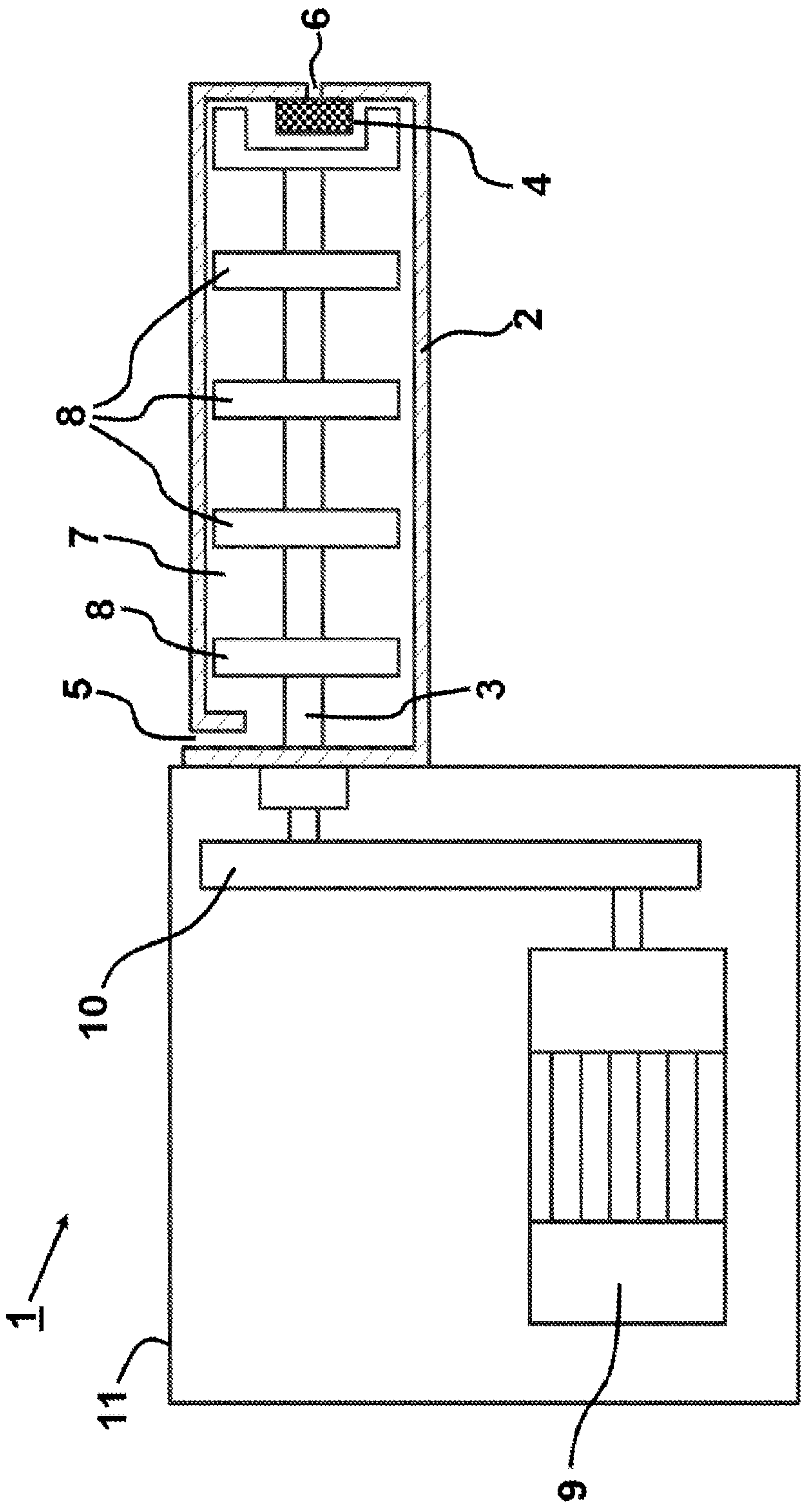
FIG. 1 shows a schematic depiction of an agitator mill.
Figure 2:
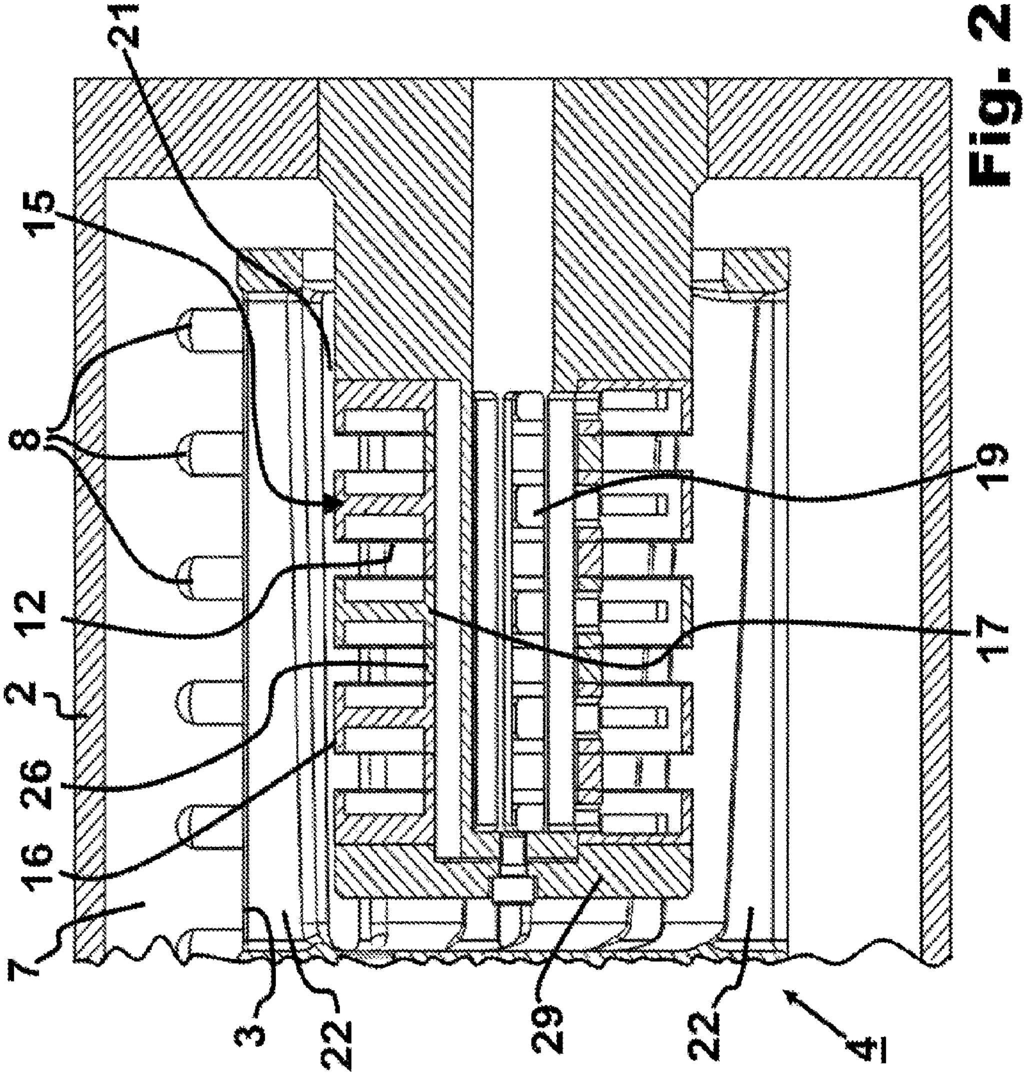
FIG. 2 shows the sieve of an inventive agitator mill in a longitudinal section.

FIG. 2 depicts in a lengthwise sectional view a first embodiment of an inventive agitator mill 1 having a sieve 4.

The sieve 4 is situated in a sieve chamber 21. The sieve chamber 21 is configured by a section of the agitator shaft 3 which is configured as a hollow shaft. It is also possible here, instead, that a rotary cage, which configures the sieve chamber 21, is fastened to the agitator shaft 3. Agitator elements 8 are also preferentially situated on the non-facing side of the section of the agitator shaft 3 configuring the sieve chamber 21. The said elements 8 set the grinder media in motion. The result is that the grist transported by the carrier substance in the direction of the sieve 4 is crushed by the grinding media in passing the agitator elements 8.

Because the grinding media are set into a motion in the peripheral direction of the agitator shaft by the agitator shaft 3 and the agitator elements 8, they are in principle kept distant from the sieve 4 by the thereby arising centrifugal forces. In addition, the portion of the agitator shaft 3 configuring the sieve chamber 21 and the mill housing 2 together form a channel, which must be traversed by the carrier substance and the grist as well as by the grinding media if the latter stream in the direction of the sieve 4. Even when the agitator shaft 3 is stationary, the grinding media do not therefore automatically advance as far as the sieve 4.

Figure 2A:
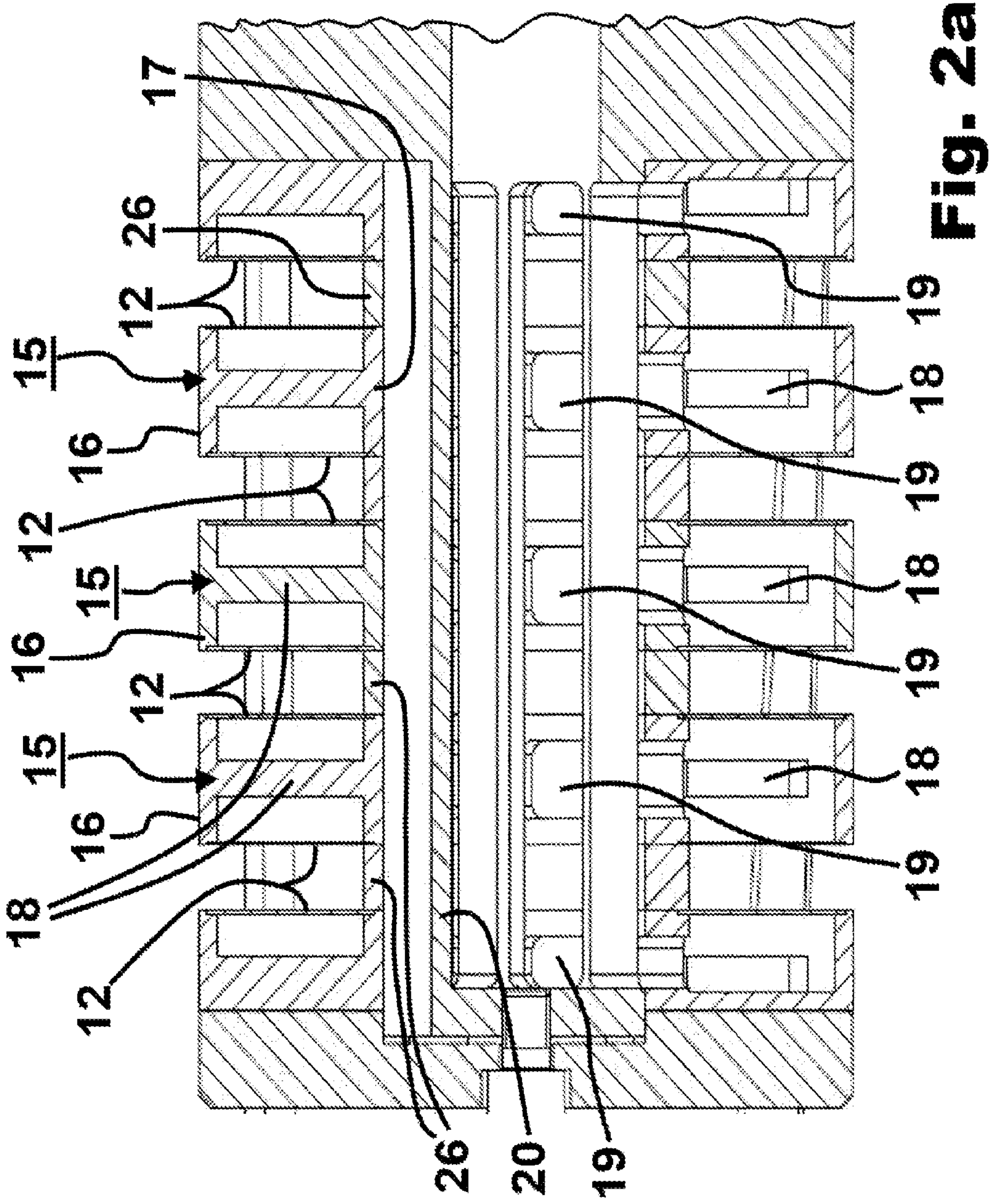
FIG. 2*a* shows an enlarged section from FIG. 2.

The sieve 4 is made up of several sieve carriers 15 (compare in particular the enlarged sectional view, FIG. 2*a*), on each of which one or two sieve elements 12 are mounted. By means of hubs 17, the sieve carriers 15 here are mounted in a parallel row on a drain tube 20.

To safeguard the sieve carriers 15 axially against slipping, one of the sieve carriers 15 is contiguous with the mill housing 2 when in assembled state. In addition, distancing sleeves 26 are provided between the individual sieve carriers 15. The sieve carrier 15 mounted on the free end of the drain tube 20, in addition, is secured by an axial safety device 29.

The first and last sieve carriers 15 preferably each carry only a single sieve element 12 on their free front surface. The sieve carriers 15 situated between the first and last sieve carriers 15 each carry a sieve element 12 on their two free front surfaces.

Figure 2B:
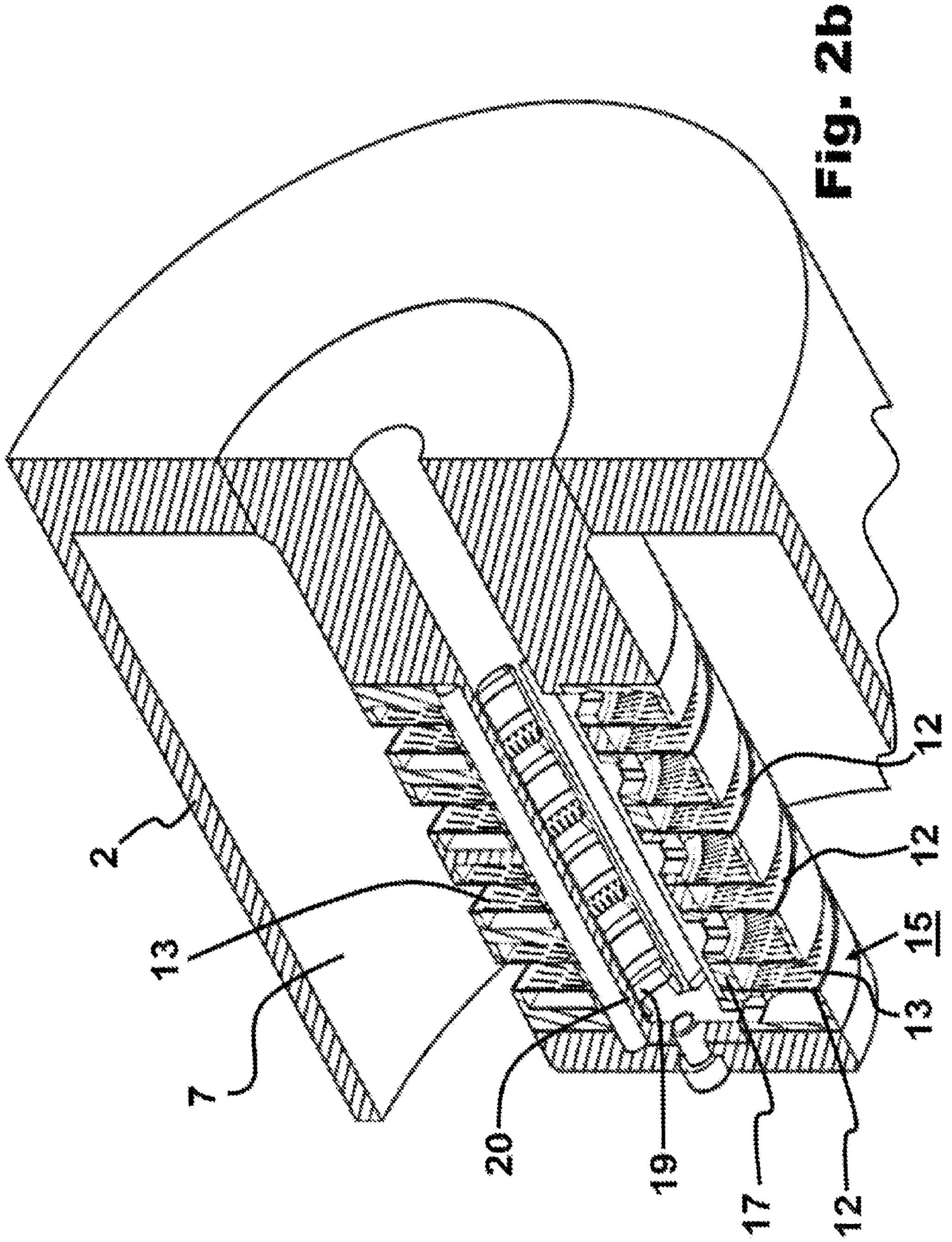
FIG. 2*b* shows a perspective view of the arrangement shown in FIG. 2.

The sieve elements 12 comprise sieve openings 13 (compare here, in particular, FIG. 2*b*). The diameters of the sieve openings 13 are of such a size that only the carrier substance coming out of the mill chamber 7 together with the ground grist is able to pass through them. The grinding media, on the other hand, cannot pass through the sieve openings 13.

After the carrier substance, together with the grist, has passed through a sieve element 12 into the interior of a sieve carrier 15, they can flow by way of the respective discharge openings 19 of the hubs 17 of the sieve carriers 15 and by way of the discharge openings 27 of the drain tube 20 into the drain tube 20. From there, finally, they flow out of the mill housing 2.

Because the sieve 4 is situated in the sieve chamber 21, the grinding media are, in principle, kept at a distance from the sieve 4. However, it can also happen that grinding media arrive in the sieve chamber 21 through the channel between the agitator shaft 3 forming the sieve chamber 21 and the mill housing 2. Because of the rotating motion of the portion of the agitator shaft 3 forming the sieve chamber 21, however, the grinding media situated in the sieve chamber 21 are also set in rotating motion about the longitudinal axis of the agitator shaft 3. To ensure that the grinding media are moved out of the sieve chamber 21 by the resulting centrifugal forces, slits 22 are provided in the portion of the agitator shaft 3 forming the sieve chamber 21. The sieve elements 12 are thus barely in contact with moved grinding media. Formations of abrasive wear, caused by the grinding media on the sieve elements 12, are thus avoided to the maximum possible extent. On the outer rings 16 of the sieve carriers 15, however, there can occur increased contact with the grinding media when so many grinding media are situated in the sieve chamber 21 that they accumulate in the region of the slits 22 before they can proceed out of the sieve chamber 21 by way of the slits 22 as a result of centrifugal forces. For this reason, the outer rings 16 are preferably made of abrasion-resistant, often ceramic material.

Because the individual components of the grist have a markedly lower weight than the grinding media, the centrifugal forces acting on the grist on the other hand are not sufficient to overcome the suction that prevails on the sieve elements 12.

Figure 3:
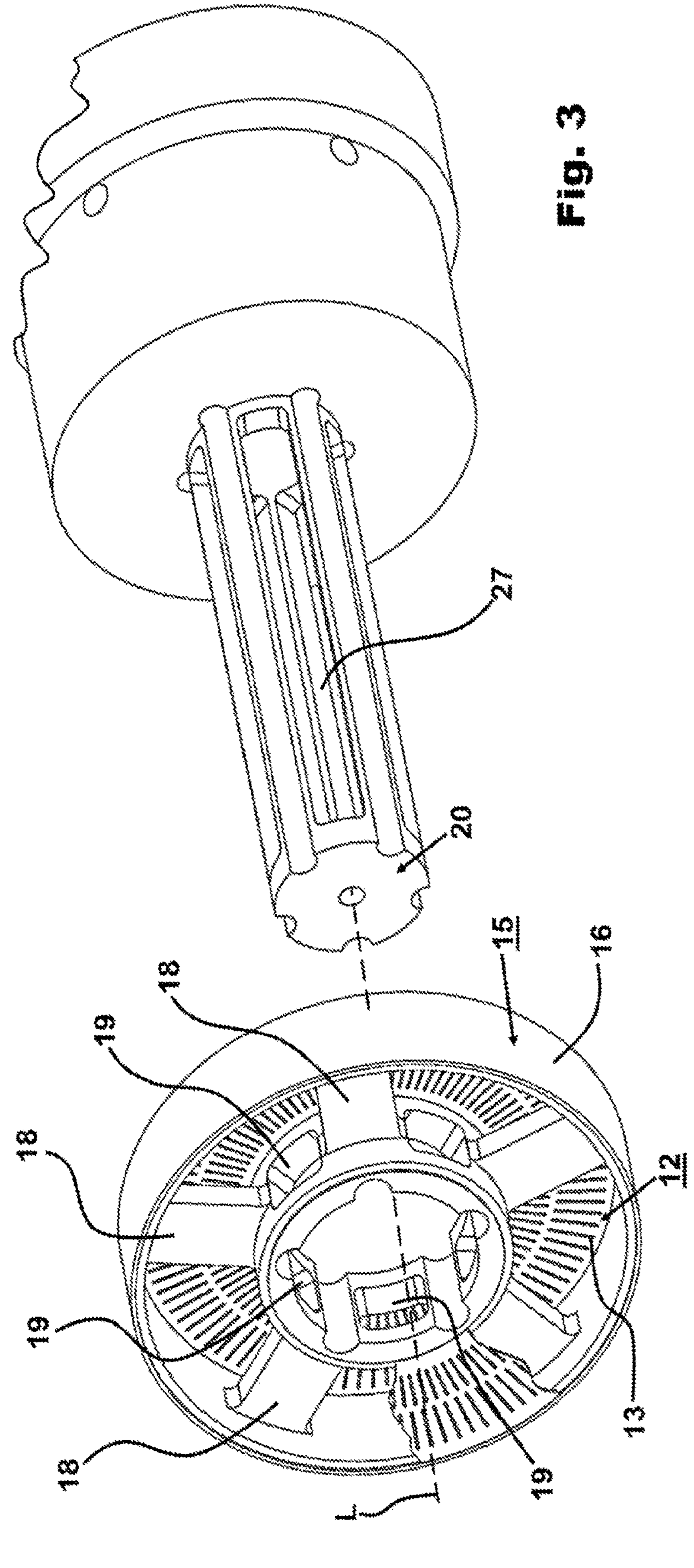
FIG. 3 shows an isometric explosion depiction of a sieve carrier with assembled sieve element and a drain tube.

FIG. 3 depicts a single sieve carrier 15 together with a sieve element 12; in the foreground the drain tube 20 is shown. The sieve element 12 here is shown in partial sectional view in order to be able to indicate the interior of the sieve carrier 15.

As can be seen, a sieve element is preferably designed as essentially or completely level. A sieve element preferably has the form of a disc extending with its surfaces completely or at least essentially in the radial direction.

The outer ring 16 of the sieve carrier 15 is connected with the hub 17 by means of spokes 18. Accordingly, the interior of the sieve carrier 15 offers considerable space for the carrier substance flowing in through the sieve element 12 and the grist. The carrier substance together with the grist can thus flow into the drain tube 20 through the discharge openings 19 of the hub 17, which in assembled state are congruent with the discharge openings 27 of the drain tube 20.

Figure 4:
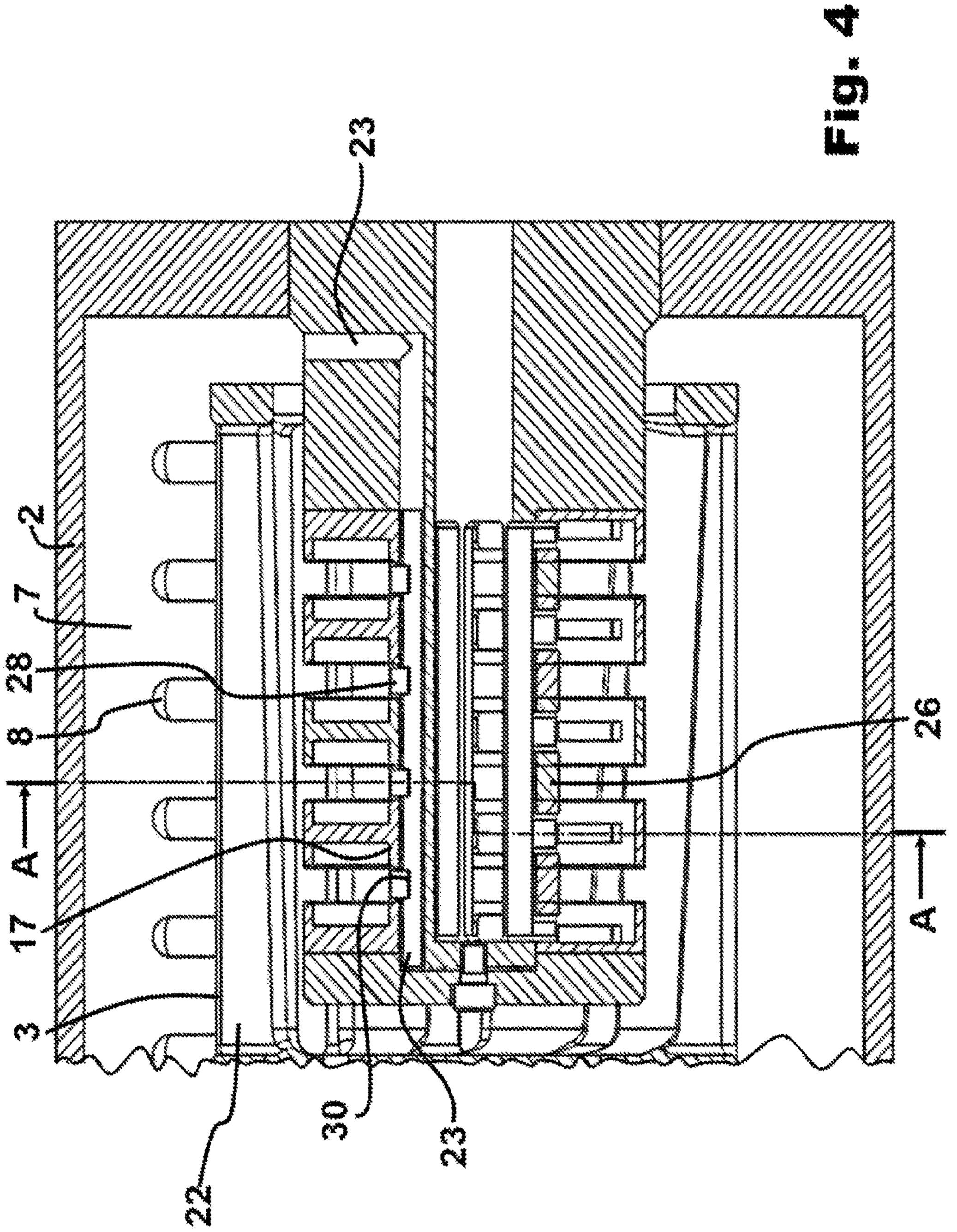
FIG. 4 shows the sieve of an inventive agitator mill with compensation channel in longitudinal section, that is, of a second, especially preferred embodiment.
Figure 4A:
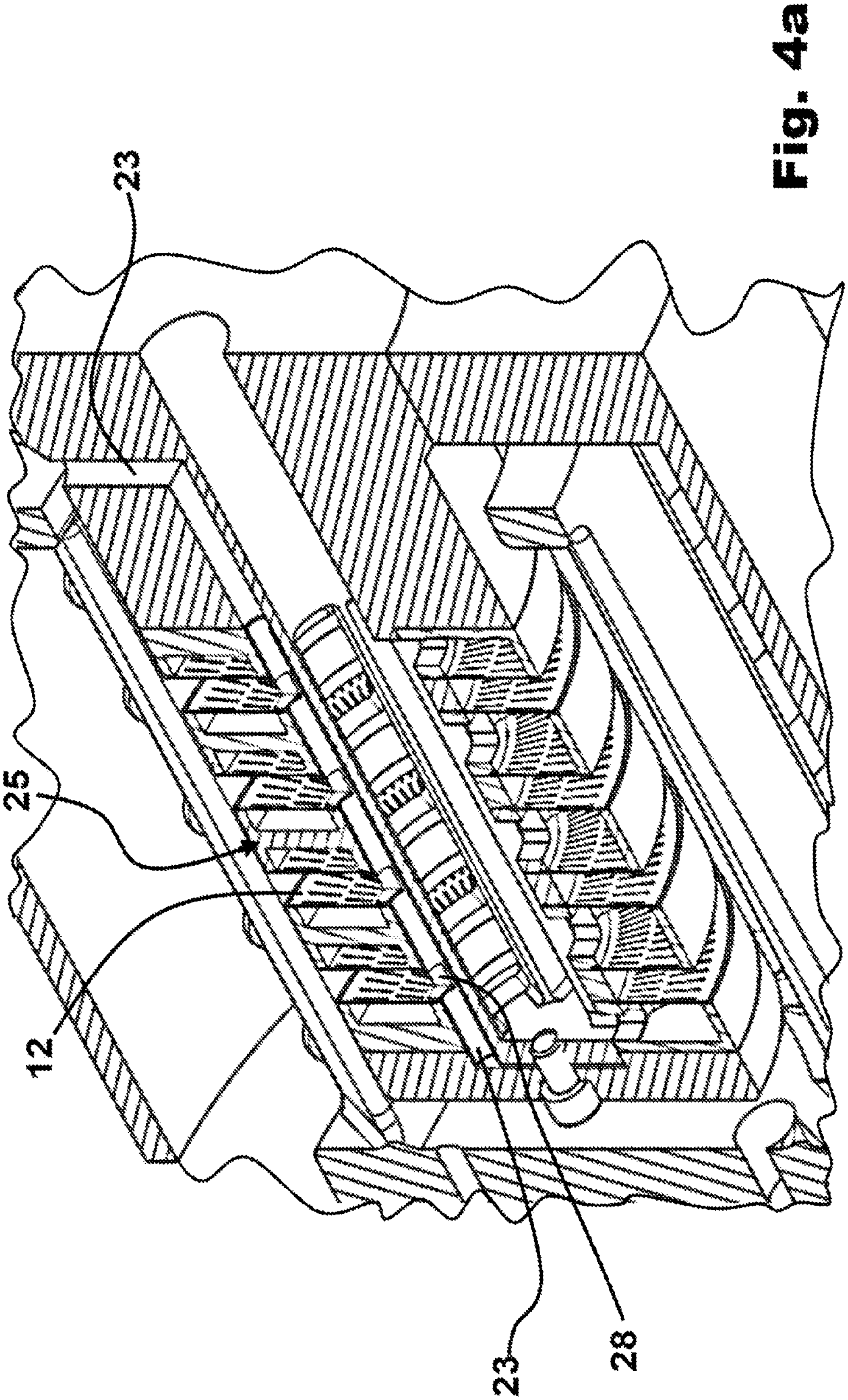
FIG. 4*a* shows a perspective view of the ensemble shown in FIG. 4.
Figure 5:
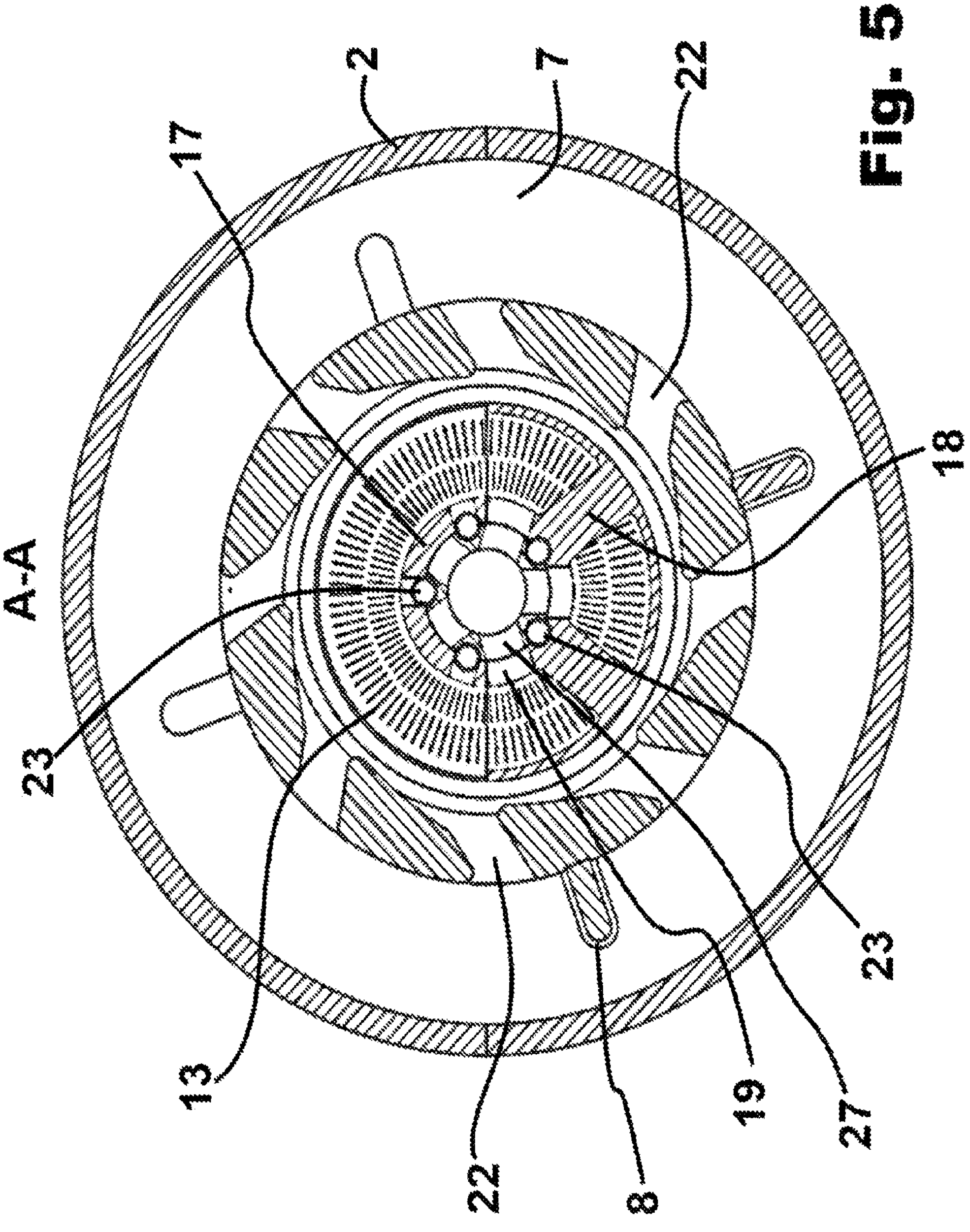
FIG. 5 shows the sieve illustrated in FIG. 4 in cross-section with bent cutting sequence.

An additional embodiment is shown in FIGS. 4, 4*a* and 5. It foresees in addition one or at most several compensation chambers 23. The compensation chambers 23 are configured by tubes which when mounted run between the drain tube 20 and the hub 17 of the sieve carriers 15. The pressure adjustment discussed above can occur by means of the compensation channels 23. For this purpose, the compensation channels 23 comprise the openings 30. The latter, when assembled, are congruent with the openings 28 in the distancing hubs 26 situated between the sieve carriers 15.

Figure 6:
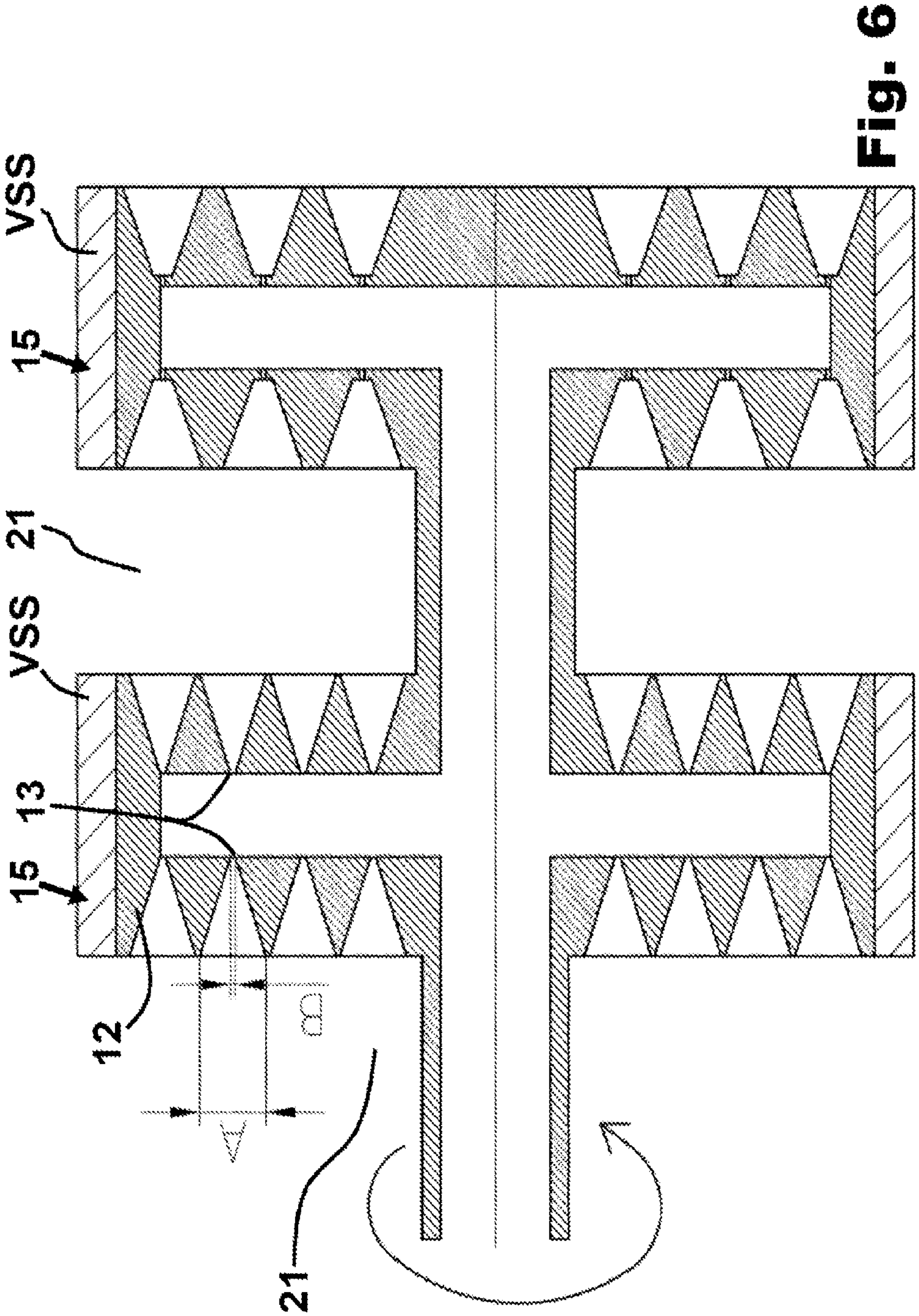
FIG. 6 shows a section with sieve carriers whose sieve elements are equipped with specially configured, preferred funnel-shaped sieve openings.
Figure 7:
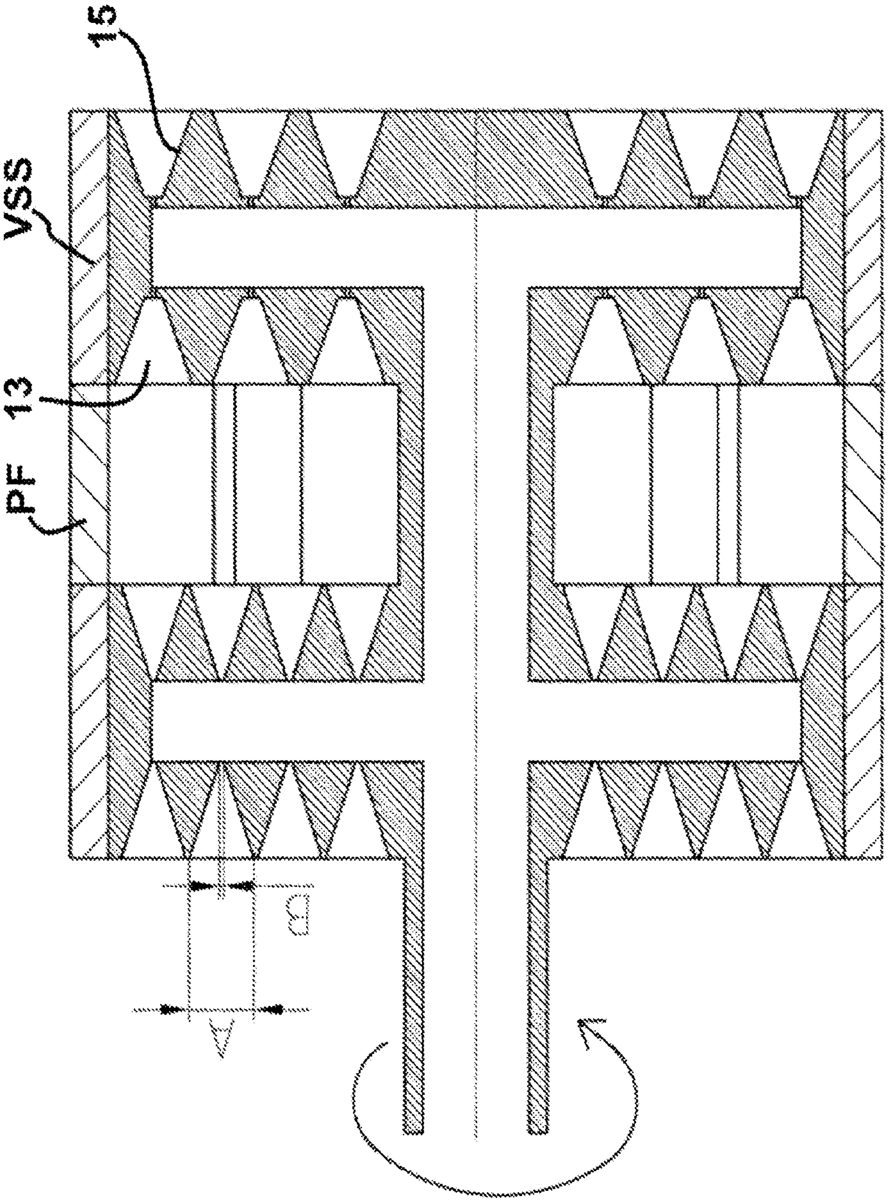
FIG. 7 shows a variant of the ensemble of FIG. 6, which now is equipped with pump vanes.
Figure 8:
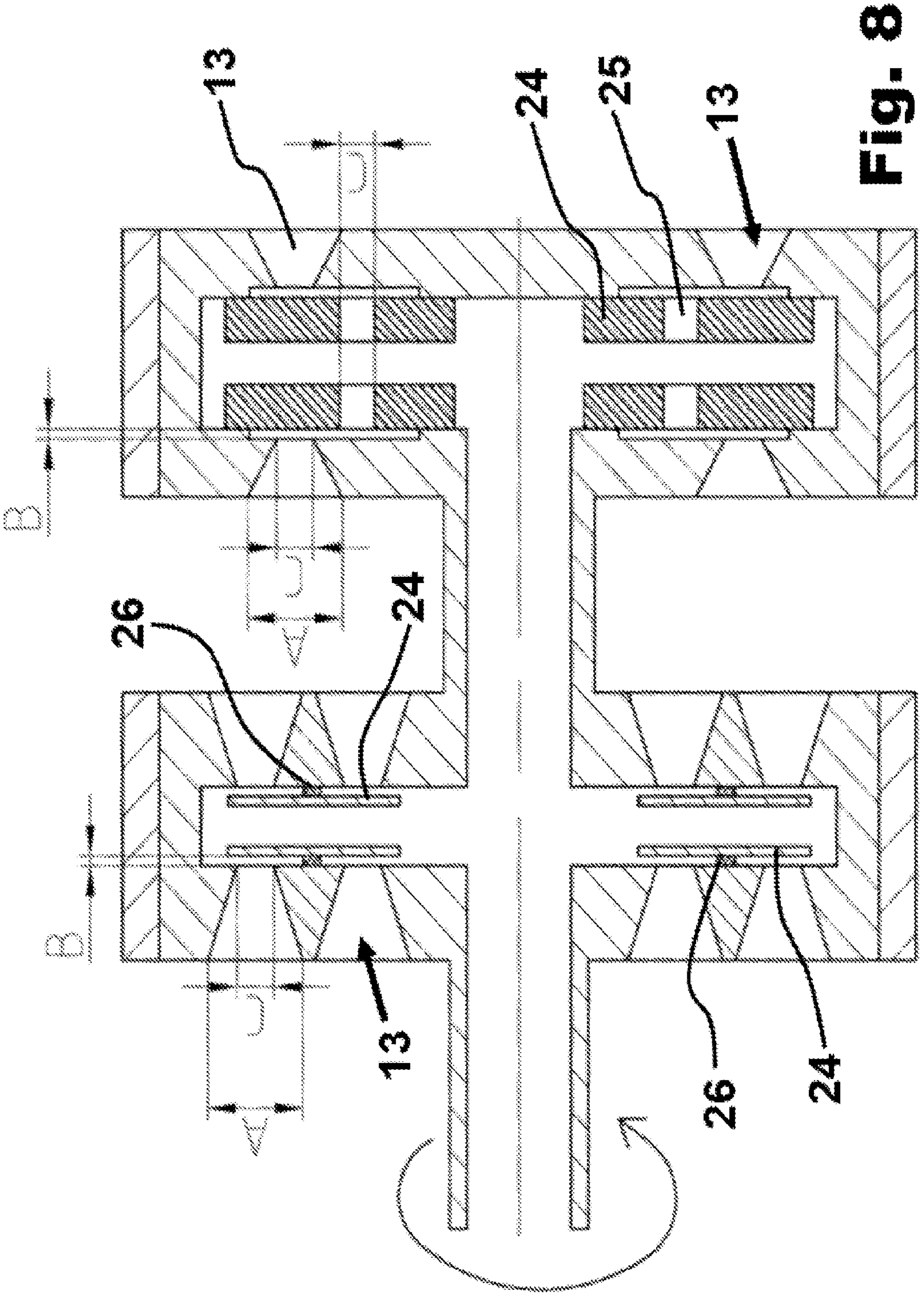
FIG. 8 shows a section with sieve carriers, which employs sieve elements with additional separator plates.

Shown in FIGS. 6 through 8 are various embodiments of the sieve openings 13 in the sieve elements 12.

Figure 6B:
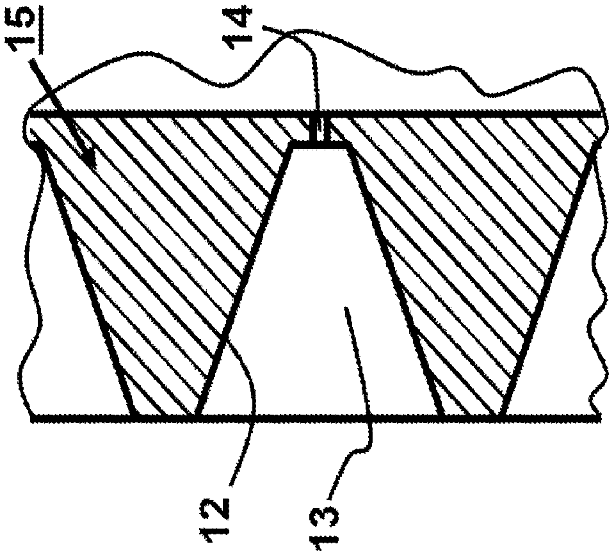
FIG. 6*b* shows a section enlargement from the right-hand sieve carrier of FIG. 6.
Figure 6A:
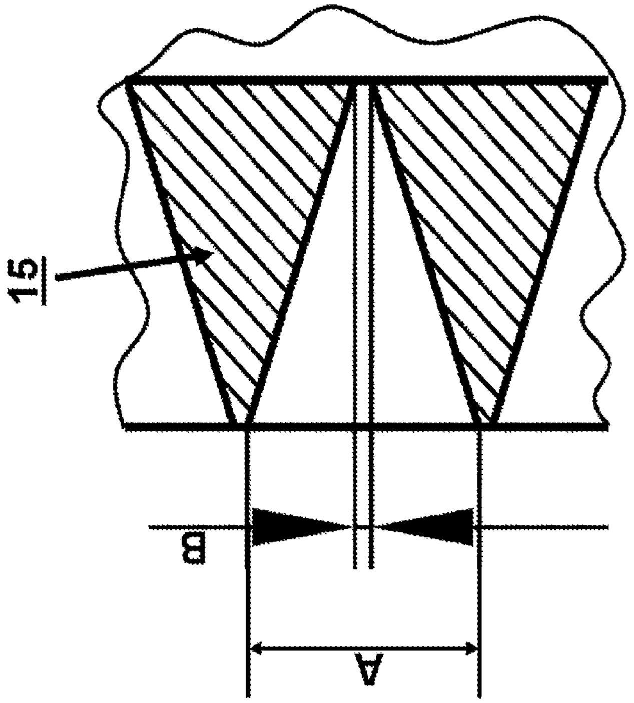
FIG. 6*a* shows an enlarged section from the left-hand sieve carrier of FIG. 6.

In FIGS. 6 and 6*a*, at least a few of the sieve openings 13 on the side of the sieve element 12, through which the carrier substance together with the grist flows into the sieve carrier 15, have a greater diameter than on the side of the sieve element 12, which is situated inside the sieve carrier 15. The transition from the greater diameter to the smaller diameter here is preferably funnel-shaped or conical. In such a configuration of the sieve openings 13, besides the grist, grinding media can also, at least partly, stream into the sieve opening 13. The greatest diameter A of the sieve opening 13 is accordingly greater than the diameter of the grinding media. This has the advantage that the grinding media cannot strike with pressure against the edge of a sieve opening 13 that is relevant to the functioning of the sieve, because beforehand they penetrate the respective sieve opening 13. The grinding media not only come into contact with the edges, but also with the sieve opening 13 rather extensively, thus further reducing abrasion.

Here the smallest diameter B, or the smallest thin cross-section of the sieve opening 13, can be smaller than the grinding media, so that the latter cannot pass through the respective sieve opening 13. Alternatively, this configuration, in accordance with FIGS. 6 and 6*a*, can also be such that the said smallest diameter is also greater than the grinding media—depending on whether this is a matter of a dynamic or a static design in the aforementioned sense.

The configuration illustrated here contributes to making the grinding media nevertheless unable to pass through, particularly when stationary, because they thus, after their penetration into a sieve opening, fall back down the slope toward the outside under the impact of their weight, and thus back into the sieve space.

Easily recognizable in FIGS. 6 and 6*a* is the abrasion-resistant layer VSS, which encloses or encircles the peripheral enclosure surface of a sieve carrier 15.

In at least a few or even all of the sieve openings 13 of the embodiment shown in FIG. 6 (compare FIG. 6*b*), the diameter of the sieve opening 13 starting from the side of the sieve element 12 at which the carrier substance flows into the sieve carrier 15, likewise decreases like a funnel or conically and then suddenly grows smaller. From the point where the diameter suddenly decreases, it finally forms a channel 14 having a primarily constant diameter. At that point the diameter of the channel 14 is finally smaller than the median diameter of the grinding media. Until reaching this channel 14, accordingly, the grinding media can penetrate the sieve opening 13. However, the channel 14 is situated so far inside the sieve opening 13 that a grinding medium that has penetrated must leave its regular motion path in order to reach that point. Consequently, the grinding medium reaches the channel 14 only with a reduced mobile energy and thus causes no appreciable damage to the channel 14.

The embodiment according to FIG. 7 corresponds completely to the one shown in FIG. 6. There is just one difference. Bridges or pump vanes PF are provided between immediately neighboring sieve carriers. They are configured in such a way that they produce a pumping effect that propels the grinding media outward or supports the outward impetus.

In the embodiment shown in FIG. 8 (left-hand side) the sieve openings 13 optionally also comprise a cross-section that tapers in the manner of a funnel or cone or trapezoid. Its smallest diameter or slender cross-section C can thus be greater than that of the grinding media. On the side of the sieve element 12, which is situated inside the sieve carrier 15, in addition, a separator plate 24 is disposed on the sieve element 12 in such a way that the sieve openings 13 are covered. However, between the separator plate 24 and the sieve element 12, a distancing brace 26 is provided. Accordingly, a small "air" gap is situated between the separator plate 24 and the sieve element 12. This air gap is of such a size that grinding media that have penetrated the sieve opening 13 cannot pass through it. On the other hand, the carrier substance together with the grist can proceed through the air gap into the interior of the sieve carrier 15. With this embodiment as well, the grinding medium can no longer cause abrasive effects once it has advanced into the sieve opening 13 as far as the separator plate 24.

In the embodiment shown in FIG. 8 (right-hand side), the sieve openings 13 have a conical cross-section. They could also have a constant cross-section, however. In either case, a separator plate 24 is provided here on the sieve element 12 side that is situated inside the sieve carrier 15. The plate is situated immediately contiguous with the sieve element 12 and covers the sieve openings 13. However, the otherwise preferred, circularly insulated separator plate 24 likewise has at least one opening 25, such openings being set off from the sieve openings 13. The width of the sieve element 12 in the region of the setoff, between a sieve opening 13 and an opening 25 of the separator plate 24, is reduced in such a way that a gap remains between the separator plate 24 and the sieve element 12. The carrier substance together with the grist can stream through this gap into the interior of the sieve carrier 15. The grinding media, however, cannot pass through the gap. Here as well, however, the grinding media can cause no further abrasive friction effect once they have penetrated the sieve opening 13 as far as the separator plate 24.

Optionally, it is possible eventually to claim protection also for the following aspects, either for each separately or more broadly to include additional technical features from the description and/or the drawings and/or expanded by individual features or all features of one or more already stated subsidiary claims, regardless of their reference to the already existing claims.

An agitator mill 1, in particular an agitator bead mill having a mill housing, in which an agitator shaft, preferably bearing agitator elements, circulates in such a way that a grinding chamber is configured between the agitator shaft and the mill housing, and into said chamber the grist is fed, transported by a fluid carrier substance, as a rule in the form of a suspension, wherein the grinding chamber is partially filled with grinding media, wherein the grist, transported by the fluid carrier substance, is discharged together with the carrier substance through a sieve, which retains grinding media, wherein the sieve either consists only of a single sieve element, ideally extending essentially radially or in rare cases diagonally, dispensing with a sieve element, which configures a peripheral enclosure surface; or essentially consisting of several, preferably at least 10 sieve elements flowing in parallel, one after the other, along the longitudinal axis of the agitator mill.

The invention claimed is:

1. An agitator mill comprising:

a mill housing, an agitator shaft that circulates within the mill housing, and a grinding chamber provided between the agitator shaft and the mill housing, the grinding chamber being configured to receive a grist, wherein the grist is transported by a fluid carrier substance in a form of a suspension within the grinding chamber, wherein the grinding chamber is partially filled with grinding media, the grinding media being set in motion by the circulating agitator shaft to crush the grist that is transported by the fluid carrier substance, wherein the grist is discharged together with the fluid carrier substance through a sieve, the sieve being configured to retain the grinding media within the grinding chamber, wherein the sieve comprises several sieve elements arranged in parallel one after another along a longitudinal axis of the agitator shaft, the sieve elements having surfaces through which the grist and the fluid carrier substance penetrate, wherein the surfaces extend diagonally or radially relative to the longitudinal axis, wherein at least a portion of the agitator shaft is hollow, and wherein the sieve is arranged in a sieve chamber configured in the hollow portion of the agitator shaft.

2. The agitator mill according to claim 1, wherein each of the sieve elements is arranged at a front surface of at least one sieve carrier, the at least one sieve carrier having a peripheral side that is closed, wherein each of the sieve elements is constructed of steel.

3. The agitator mill according to claim 2, wherein the at least one sieve carrier comprises a plurality of sieve carriers, each of the plurality of sieve carriers having two front surfaces, wherein each of the two front surfaces is configured by one of the sieve elements.

4. The agitator mill according to claim 1, wherein the agitator mill comprises a plurality of sieve carriers, each of the plurality of sieve carriers includes an outer ring that defines a closed peripheral enclosure surface.

5. The agitator mill according to claim 4, wherein:

the outer ring is constructed of ceramic, or the peripheral enclosure surface includes a coating to reduce abrasion.

6. The agitator mill according to claim 4, wherein each of the plurality of sieve carriers includes a hub and spokes extending radially out from the hub sleeve, the spokes connecting the outer ring to the hub sleeve.

7. The agitator mill according to claim 6, wherein the hub of at least one of the sieve carriers includes at least one discharge opening for the fluid carrier substance and the grist.

8. The agitator mill according to claim 6, further comprising a drain tube, wherein the sieve carriers are mounted on the drain tube, wherein the drain tube includes at least one discharge opening through which the fluid carrier substance and the grist flow out of the sieve carrier into the drain tube.

9. The agitator mill according to claim 8, wherein the sieve carriers are carried by the drain tube, and wherein the sieve carriers are configured to be rotated with the drain tube.

10. The agitator mill according to claim 1, further comprising at least two sieve carriers arranged along the longitudinal axis, each of the at least two sieve carriers having one of the sieve elements.

11. The agitator mill according to claim 1, wherein the grinding chamber is connected by rotary openings with the sieve chamber, wherein main extending axes of the rotary openings run parallel to the longitudinal axis.

12. The agitator mill according to claim 1, wherein the sieve elements rotate with the agitator shaft, wherein individual sieve openings of each of the sieve elements have a greater diameter than the grinding media on a side of the sieve element where the fluid carrier substance and the grist flow from the grinding chamber.

13. The agitator mill according to claim 12, wherein each of the individual sieve openings taper in a funnel shape, in an inward direction.

14. The agitator mill according to claim 1, wherein the sieve chamber and the sieve are rotatable.

15. An agitator mill comprising:

a mill housing, an agitator shaft that circulates within the mill housing, a grinding chamber provided between the agitator shaft and the mill housing, the grinding chamber being configured to receive a grist, wherein the grist is transported by a fluid carrier substance in a form of a suspension within the grinding chamber, a plurality of sieve carriers, each of the plurality of sieve carriers includes an outer ring that defines a closed peripheral enclosure surface, each of the plurality of sieve carriers includes a hub and spokes extending radially out from the hub sleeve, the spokes connecting the outer ring to the hub sleeve, and a drain tube, wherein the sieve carriers are mounted on the drain tube, wherein the drain tube includes at least one discharge opening through which the fluid carrier substance and the grist flow out of the sieve carrier into the drain tube, wherein the grinding chamber is partially filled with grinding media, the grinding media being set in motion by the circulating agitator shaft to crush the grist that is transported by the fluid carrier substance, wherein the grist is discharged together with the fluid carrier substance through a sieve, the sieve being configured to retain the grinding media within the grinding chamber, wherein the sieve comprises several sieve elements arranged in parallel one after another along a longitudinal axis of the agitator shaft, the sieve elements having surfaces through which the grist and the fluid carrier substance penetrate, wherein the surfaces extend diagonally or radially relative to the longitudinal axis, wherein the sieve carriers are carried by the drain tube, and wherein the sieve carriers are configured to be rotated with the drain tube, wherein the drain tube includes at least one compensation channel through which the fluid carrier substance and the grist are conveyed and discharged into at least one intermediate space, wherein each of the at least one compensation channel is configured as a tube that is disposed between the drain tube and the hub.

16. An agitator mill comprising:

a mill housing, an agitator shaft that circulates within the mill housing, and a grinding chamber provided between the agitator shaft and the mill housing, the grinding chamber being configured to receive a grist, wherein the grist is transported by a fluid carrier substance in a form of a suspension within the grinding chamber, wherein the grinding chamber is partially filled with grinding media, the grinding media being set in motion by the circulating agitator shaft to crush the grist that is transported by the fluid carrier substance, wherein the grist is discharged together with the fluid carrier substance through a sieve, the sieve being configured to retain the grinding media within the grinding chamber, wherein the sieve comprises several sieve elements arranged in parallel one after another along a longitudinal axis of the agitator shaft, the sieve elements having surfaces through which the grist and the fluid carrier substance penetrate, wherein the surfaces extend diagonally or radially relative to the longitudinal axis, wherein the sieve elements rotate with the agitator shaft, wherein individual sieve openings of each of the sieve elements have a greater diameter than the grinding media on a side of the sieve element where the fluid carrier substance and the grist flow from the grinding chamber, wherein each of the individual sieve openings taper in a funnel shape, in an inward direction, wherein the funnel shaped taper of each sieve opening merges into a channel that has a diameter less than the diameter of the grinding media.

17. An agitator mill comprising:

a mill housing, an agitator shaft that circulates within the mill housing, and a grinding chamber provided between the agitator shaft and the mill housing, the grinding chamber being configured to receive a grist, wherein the grist is transported by a fluid carrier substance in a form of a suspension within the grinding chamber, wherein the grinding chamber is partially filled with grinding media, the grinding media being set in motion by the circulating agitator shaft to crush the grist that is transported by the fluid carrier substance, wherein the grist is discharged together with the fluid carrier substance through a sieve, the sieve being configured to retain the grinding media within the grinding chamber, wherein the sieve comprises several sieve elements arranged in parallel one after another along a longitudinal axis of the agitator shaft, the sieve elements having surfaces through which the grist and the fluid carrier substance penetrate, wherein the surfaces extend diagonally or radially relative to the longitudinal axis, wherein the sieve elements rotate with the agitator shaft, wherein individual sieve openings of each of the sieve elements have a greater diameter than the grinding media on a side of the sieve element where the fluid carrier substance and the grist flow from the grinding chamber, wherein the agitator mill further comprises separator plates, wherein each of the separator plates being disposed on an inner surface of one of the sieve elements at a downstream side of the individual sieve openings, so that a gap is configured between the inner surface of the sieve element and each of the separator plates, and wherein the fluid carrier substance and the grist must pass through the gap at a connection point of each of the individual sieve openings.

18. The agitator mill according to claim 17, wherein each of the separator plates has a plurality of openings, each of the plurality of openings having an axis that runs parallel to the longitudinal axis of the agitator shaft, wherein the plurality of openings of each of the separator plates and the individual sieve openings of a corresponding sieve element of the sieve elements are disposed at a distance from one another, as seen in a radial and/or in a peripheral direction, such that the fluid carrier substance and the grist must pass through the gap in order to flow out from the individual sieve openings through the openings of the separator plate.

19. The agitator mill according to claim 17, wherein the gap has a gap height which is at least 30% smaller than the diameter of a smallest grinding medium.

* * * * *